Apr. 10, 1923.
C. N. BENSON
1,451,523
BEARING MOUNTING
Filed Apr. 20, 1922
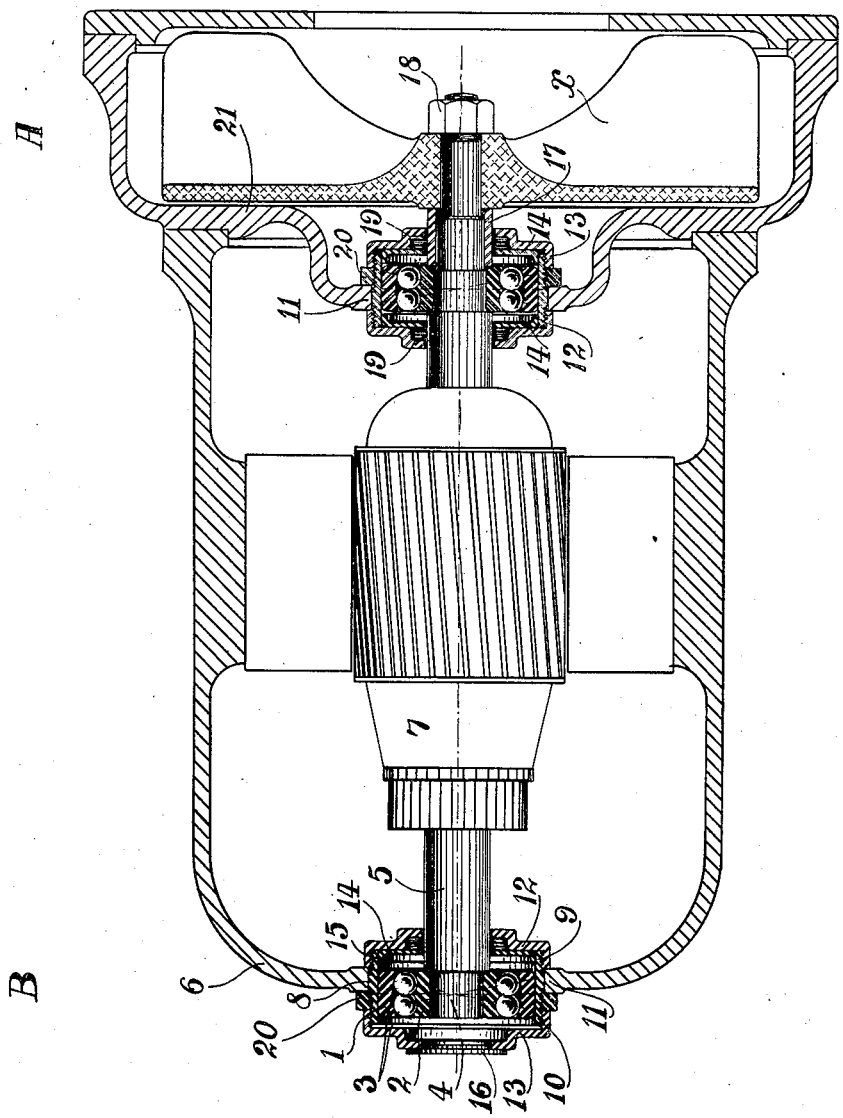
Inventor
Carl N. Benson
By his Attorneys
Rogan, Kennedy Campbell Patented Apr. 10, 1923.

1,451,523

UNITED STATES PATENT OFFICE.

CARL N. BENSON, OF NEW YORK, N. Y., ASSIGNOR TO THE SKAYEF BALL BEARING COMPANY, A CORPORATION OF CONNECTICUT.

BEARING MOUNTING.

Application filed April 20, 1922. Serial No. 555,688.

*To all whom it may concern:*

Be it known that I, CARL N. BENSON, a citizen of the United States, residing at New York, in the borough of Manhattan and State of New York, have invented certain new and useful Improvements in Bearing Mountings, of which the following is a specification, reference being had therein to the accompanying drawing.

This invention relates to a casing or closure and mounting for ball and roller bearings, and has for an object to provide an article of manufacture which, with the bearing, constitutes a self-contained handling unit adapted to be placed upon the shaft, and with such shaft, still as a self-contained handling unit, adapted for insertion into the supporting structure for the shaft.

As a casing or closure, this is a double purpose or double function device, its design and construction adapting it not only to form a permanent housing for a ball or roller bearing, but also continuous uninterrupted protection for such bearing, extending over three progressive periods of its life, namely: (a) prior to the application of the bearing to the shaft, (b) after such application and prior to the mounting of the shaft in its supporting structure, and (c) during and after such mounting. These may be otherwise summarized: (a) Merchandise, from the completion of its fabrication, through delivery to the user and its application to the shaft which it is destined to support, (b) applied to the shaft, the shaft not installed in its supporting structure, (c) bearing and shaft completely installed:—or transportation, transition, use.

Employment of this mounting completely changes the procedure or shop practice in installing ball and roller bearings, particularly in small electric apparatus, by making it feasible to mount the bearings on the shaft (in a motor the armature shaft,) as a separate and disconnected step from that of installing the bearings and the shaft in the motor casing or other shaft supporting structure. The shaft and parts directly mounted upon it, (the ball bearings and their mounting casings,) thus constitute a self-contained handling unit, which, so far as the integrity of the bearings is concerned, may be exposed with impunity to dust and dirt and be roughly treated.

According to this procedure, the seat for the outer ring of the bearing is finished and inspected and the bearing installed by the fabricant of such bearing, which assures that it be mounted and fitted in the housing by operatives familiar with all the technical requirements. This preliminary work relieves the user of the bearings, or rather the manufacture who builds or installs them into his own product, of the necessity of familiarizing himself with these technicalities and of employing operatives possessing the necessary skill in this respect. Efficiency and economy form the basis upon which this improvement is founded.

The drawing accompanying this specification shows a small motor and its casing equipped with my improved mounting, the parts of the latter being shown in axial section.

The subject matter of this invention being a device built about an anti-friction bearing for the purpose of housing and protecting the same, reference will first be made to the illustrative example of the bearing herein shown. Such bearing comprises an outer ring, 1, an inner ring, 2, between which rings are interposed the rolling elements, 3. The bearing in the present illustration is a self-contained handling unit, and incidentally is of the full self-aligning type. The inner ring, 2, of the bearing is provided with a bore adapted to seat upon some suitable shaft. In the present illustration it is shown mounted upon a reduced portion, 4, of an armature shaft, 5. For convenience of description and illustration the invention is shown applied to the shaft of an electric motor which the ball bearings are designed to support within the housing, 6. Substantially similar ball bearings and casings or boxes are shown at the respective ends of the armature, 7.

The outer race 1 of the anti-friction bearing is intended for engagement with a suitably formed housing in the framework which is to support the shaft through it, in the present illustration the framework being the casing, 6, of the motor. In mounting ball and roller bearings it is necessary that the portion of the casing which is to receive the outer ring of the bearing shall be carefully machined within very close tolerances, and that where two of these seats or housings are provided for supporting a single shaft, that they shall be aligned with great accuracy. The skill required for this work is frequently not possessed by the workman engaged in the plant manufacturing the device, as a whole, in which the anti-friction bearings are to be installed. This requires either the employment of mechanicians of special training and ability, or else that the work be done in an unsuitable manner, with results in one case of adding largely to the overhead of the establishment, and in the other, of improper mounting of bearings followed by their unsatisfactory behavior or failure. My invention provides a housing or box which is made by the fabricant of the antifriction bearing who is familiar with the requirements of its mounting and which box itself does not require so nice a fit with the supporting structure as does the outer race ring of the bearing.

My improved closure or box in the preferred form herein illustrated comprises a housing-sleeve or tube, 8, the bore of which is finished for affording a proper fit for the outer ring, 1, of the anti-friction bearing to be enclosed, the outer side of the respective ends, 9, 10, of this housing-sleeve being shown screw threaded, and the portion intermediate these provided with a surface suitable for engaging the bore of the hub, 11, of the casing, 6. In the illustration the ends of the sleeve are similar, and caps, 12 and 13, have screw threaded connection with these, within which caps, when in place, are located distance pieces or separators shown as sheet metal diaphragm members, 14, each of which is provided with a central opening and a transverse flange, 15. The edge of the flange is adapted to engage the side face of the outer ring of the bearing, for limiting the axial movement of the bearing within the sleeve, 8. The space within the flange affords a lubricant receptacle.

In many installations, as for instance that selected for illustration, it is desirable that one of the ball bearings, or other anti-friction bearings, shall be utilized not only for supporting the radial load of the shaft, but also to serve to locate the shaft in position and the other bearing must, from necessity, either due to the vibration of the shaft or to accommodate axial expansion and contraction, be permitted a certain amount of axial movement. In the present showing the bearing at the lefthand side of the drawing, designated B, for convenience, is the one to which axial movement is permitted for accommodating this axial variation of the shaft, and the bearing at the righthand side, designated A, is held firmly against such lateral movement.

The bearing which is to locate the shaft or stabilize this, and illustrated at the side A of the drawing, is shown locked against a shoulder inwardly of the portion, 4, upon which its inner ring is seated, by means of a sleeve, 17, and nut, 18. The caps, 12 and 13, are screwed up against the sides of the hub 11 and also against the distance pieces, 14, pressing flanges, 15, of these members against the side faces of the outer ring, 1, or nearly so.

The parts when assembled as just described hold the bearing in position upon the shaft and supporting structure. With the parts assembled as shown at the side B of the drawing, the bearing is given a certain amount of axial freedom, due to the use of a lesser amount of distancing structure, namely but one distance piece, 14. When the parts are properly fitted, this bearing may freely slide within the bore of the housing sleeve, 8. Outwardly of each of the hubs, 11, there is shown a ring, 20, having screw threaded engagement with the sleeve, 8, and serving with the inner cap to hold the other portions of the device in position on the supporting member when the outer cap is not in place.

In many instances one end only of the shaft, to be mounted upon ball bearings, is required to project beyond the bearings or outside of the supporting structure or casing. In the present illustration the end of the shaft at side A is shown extended for the purpose of carrying some work performing structure, X, and in this case the shaft projects through a suitable opening provided in the outer cap, 13. The shaft at the other side, however, is not required to so project, and consequently a closure, 16, is provided for the opening in the outer cap, 13, at that end of the shaft. The parts are illustrated as interchangeable, and are adapted for formation from sheet metal.

Assembly of the structure is effected in substantially the following manner: For convenience I will refer to the closure at the side A, having both caps open, as the open unit or box, and that at the side B, having one of its caps closed, as the closed unit or box. It is to be understood that this description is made in connection with the illustrative embodiment of the invention, and that the peculiarities of each individual installation control certain of the incidental details. Each unit of the manufacturer's product, according to this illustration, requires an open box assembly structure and a closed box assembly. These are assembled in the works in a substantially similar manner. The ball bearings, after completion and inspection, have properly fitted to them the housing sleeves, 8, into which the bearing is inserted with the requisite amount of force either for a tight fit, a sucking fit, or working fit as occasion may demand. The distance pieces, then the nut, 20, and the caps, 12 and 13, applied and the entire structure treated to an anti-rust coating, the device preferably being slushed in suitable grease. In this condition the boxes are sent to the manufacturer of the structure in which they are to be installed, and if he so desires, the original slushing grease need not be removed before the machine is sent to its ultimate user. According to another practice, which will also be described, the slushing grease is removed at an appropriate time. The bearings as above described with their housings or closures or containers constitute a self-contained handling unit for transportation through the store house of their fabricator to the manufactory of the one who will install them in his machine. When the time arrives for installing these units, two in the motor illustrated, they, together with the armature shaft containing the armature, are taken to a proper assembling room under proper conditions of cleanliness, and the inner rings, 2, of the ball bearings forced upon the shaft. For this purpose if a tight fit is desired the outer caps, 13, and the adjacent distance pieces 14 may be removed to afford access to the inner rings, after which these parts are returned to their positions. It has been found expedient in some instances to immerse the bearing and closure assembly in an oil of suitable consistency and heat to remove the slushing grease, and while in this heated condition apply the bearing to the shaft, the shaft at the time being of a much lower temperature. The necessity for the application of great force is eliminated, and upon the parts assuming uniform temperature the inner rings of the bearing are found to have a sufficiently tight fit upon the shaft. This procedure, of course, requires that the seat upon the shaft be formed with the proper tolerances for this particular mode of application of the bearing. In whatever manner the bearings are applied to the shaft, after they are in position the closures and the armature then constitute a self-contained handling unit in which the bearings are shielded from injury and contamination while the armature and shaft are passing from their assembling room either to the stock room or to their point of installation in their housing. For installation in the housing it is merely necessary to remove the outermost caps, 13, and the nuts, 20, whereupon the hub, 11, of the end plate, 21, of the casing is mounted in position upon the sleeve, 8, the nut, 20, screwed into position, and then the cap, 13, applied. The armature may then be placed within the casing, 6, the sleeve, 8, caused to pass through the hub, 11, at the side B, whereupon the nut, 20, and cap 13 are applied.

Some of the constructional features alluded to with particularity in the detailed description of the illustrated example of an installation of my invention are, of course, subject to change and modification to adapt the principal features to the varying condition of intended use, and such changes as come within the scope of the claims of my patent are to be regarded as within the spirit of my invention.

I claim as my invention:

1. An anti-friction bearing mount, comprising a bearing having inner and outer rings and rolling elements therebetween, a housing sleeve having a bore fitting the outer periphery of the said outer ring, the outer portion of the housing sleeve being screw threaded at the ends and between these formed to fit within the hub of a supporting structure, and closure caps for the ends of the sleeve and having screw threaded connection therewith and being adapted to screw up against the hub within which the sleeve may be mounted.

2. An anti-friction bearing mount, comprising a bearing having inner and outer rings and rolling elements therebetween, a housing sleeve having a bore fitting the outer periphery of the said outer ring, the outer portion of the housing sleeve being screw threaded at the ends, and between these ends being formed to fit within the hub of the supporting structure, distance pieces within the sleeve and disposed laterally of the position occupied by the said outer ring, and closure caps having screw threaded connection with the sleeve and adapted to limit the movement of the distance pieces away from the said bearing ring.

3. An anti-friction bearing mount, comprising a bearing having inner and outer rings and rolling elements therebetween, a sleeve having a bore fitting the outer periphery of the said outer ring, the outer portion of the housing sleeve being screw threaded at the ends, a shaft mounted upon the inner ring of the bearing, a housing for said shaft, said housing having a hub embracing said housing sleeve between the screw threaded ends thereof, and closure caps for the ends of the sleeve and having screw threaded connection therewith, said caps being adapted to screw up against the hub of the housing.

4. The combination with a shaft, and a housing therefor provided with hubs at its respective ends, of a pair of housing sleeves mounted in the said hubs respectively, an anti-friction bearing comprising an inner and an outer ring and a series of rolling elements mounted within each sleeve, the shaft being mounted upon the inner rings of the anti-friction bearings, distance pieces located within the housing sleeves at the sides of the bearings, the distance pieces each having a portion for engaging the outer ring of the bearing, caps having screw threaded connection with the ends of the housing sleeves, the caps being adapted to limit the outward movement of the distance pieces to such an extent as to permit a predetermined amount of free lateral movement of the bearing ring, the proportion and location of the parts being such that when the caps are screwed up against the hubs the predetermined lateral movement of one of the bearings will be substantially negligible, and that of the other will be free within the limit of possibilities of vibration of the shaft and expansion and contraction of the parts.

5. The combination with a shaft, of a housing therefor provided with hubs at its respective ends, of a pair of housing sleeves of substantially equal length mounted in the said hubs respectively, an anti-friction bearing comprising an inner and an outer ring and a series of rolling elements mounted within each sleeve, the shaft being mounted upon the inner rings of the anti-friction bearings, distance pieces of unequal length respectively located within the housing sleeves, interchangeable caps having screw threaded connection with the ends of the housing sleeves and adapted to limit the outward movement of the distance pieces.

In testimony whereof, I have affixed my signature hereto.

CARL N. BENSON.